United States Patent
Rauckman et al.

(10) Patent No.: US 10,399,210 B1
(45) Date of Patent: Sep. 3, 2019

(54) CLAMP FOR USE IN ELECTRICAL DISTRIBUTION SYSTEMS

(71) Applicant: GATO ASSETS, LLC, Belleville, IL (US)

(72) Inventors: James B. Rauckman, Swansea, IL (US); David W. McGuire, Jerseyville, IL (US)

(73) Assignee: Gato Assets, LLC, Belleville, IL (US)

( * ) Notice: Subject to any disclaimer, the term of this patent is extended or adjusted under 35 U.S.C. 154(b) by 111 days.

(21) Appl. No.: 15/644,466

(22) Filed: Jul. 7, 2017

(51) Int. Cl.
| B25B 5/04 | (2006.01) |
| H02B 3/00 | (2006.01) |
| B29C 45/00 | (2006.01) |
| B29C 45/37 | (2006.01) |
| B29L 31/00 | (2006.01) |

(52) U.S. Cl.
CPC ............ B25B 5/04 (2013.01); B29C 45/0005 (2013.01); B29C 45/374 (2013.01); H02B 3/00 (2013.01); B29L 2031/7282 (2013.01)

(58) Field of Classification Search
CPC .. B25B 5/04; B25B 5/00; B25B 5/067; B25B 5/068; B25B 5/082; B25B 5/125; B25B 5/102; H02B 3/00; B29C 45/374; B29C 45/006; B29L 2031/7282
USPC .................... 269/6, 3, 95; 264/257; 249/103
See application file for complete search history.

(56) References Cited

U.S. PATENT DOCUMENTS

| 1,162,059 | A | * | 11/1915 | Hersey | ..................... B25B 5/068 269/157 |
| 3,779,108 | A | * | 12/1973 | Reiter | ....................... B25B 5/06 24/510 |
| 6,240,815 | B1 | * | 6/2001 | Huang | ...................... B25B 5/06 269/6 |
| 6,745,441 | B1 | * | 6/2004 | Lin | ........................... B25B 5/06 100/234 |
| 6,848,683 | B2 | * | 2/2005 | Foshag | ................... B25B 5/163 269/147 |
| 7,677,141 | B1 | * | 3/2010 | Crew | ........................ B25B 5/06 81/302 |
| 8,137,379 | B2 | * | 3/2012 | Labash | .................. A61H 39/04 269/3 |

(Continued)

FOREIGN PATENT DOCUMENTS

WO    WO-2005118224 A1 * 12/2005 ............. B25B 1/205

OTHER PUBLICATIONS

Cover-Up Equipment, Chance Catalog, Oct. 2015, 1 page.

*Primary Examiner* — George B Nguyen
(74) *Attorney, Agent, or Firm* — Stinson LLP (57) ABSTRACT

A clamp for securing an electrically insulating blanket to an item of an electrical system and associated methods. The clamp includes a pair of jaws biased toward each other. The jaws include contact surface elements for improving a hold of the jaws in a clamped configuration. The contact surface elements are formed of reducing wear of material for increasing friction of the jaws on a clamped item and cushioning the jaws on the clamped item. The contact surface elements can be overmolded on bodies of the jaws. The clamp includes an actuator pin configured for engagement by a shotgun stick for opening the jaws but also configured for comfortable hand operation of the clamp. The clamp includes a button for securing the insulating blanket to the clamp. The clamp includes a key ring opening. Indicia molded onto a clamp member of the clamp.

24 Claims, 8 Drawing Sheets

(56) References Cited

U.S. PATENT DOCUMENTS

| | | | |
|---|---|---|---|
| 2008/0290248 A1* | 11/2008 | Yang | B29C 45/374 249/103 |
| 2009/0105750 A1* | 4/2009 | Price | A61B 17/320092 606/206 |
| 2013/0168897 A1* | 7/2013 | Tsai | B29C 45/14311 264/257 |

* cited by examiner

CLAMP FOR USE IN ELECTRICAL DISTRIBUTION SYSTEMS

FIELD

The present disclosure generally relates to clamps, and more particularly to a blanket clamp that can be used with an electrically insulating blanket for insulating electrical system components.

BACKGROUND

Clamps are used to hold, sometimes temporarily, items in place with respect to an object. In the context of work being done on electrical distribution systems, a clamp may be used to hold an item in place while the worker is working on the system. Insulating blankets are used in the electrical field for many purposes. For example, insulating blankets can be applied to components of an electrical distribution system to shield workers from electrical shock from the electrical system components. The insulating blankets are held in position on the electrical system components in various ways. For example, pins or buttons may be used to secure opposing edges of the blanket to each other for holding the blanket in place around another object, such as a power line. In other instances, clamps can be applied to the insulating blankets to hold the blankets in place.

SUMMARY

In one aspect, a blanket clamp is for securing an insulating blanket to a component of an electrical system. The blanket clamp includes a first clamp member defining a first jaw and a second clamp member defining a second jaw. The first and second clamp members are pivotally connected to each other for movement between a closed configuration and an open configuration. The first and second jaws each include a body and a contact surface element overmolded on the body. The contact surface element of the first jaw at least partially defines an inner surface of the first jaw facing the second jaw. The contact surface element of the second jaw at least partially defines an inner surface of the second jaw facing the first jaw. A biasing element is configured to bias the jaws toward each other to the closed configuration.

In another aspect, a method of manufacturing a blanket clamp for securing an insulating blanket to a component of an electrical system includes forming a first clamp member body having a lever and a jaw portion. After forming the first clamp member body, a contact surface element of resiliently compressible material is overmolded on at least the jaw portion of the first clamp member body. The method includes forming a second clamp member body having a lever and a jaw portion. After forming the second clamp member body, a contact surface element of resiliently compressible material is overmolded on at least the jaw portion of the second clamp member body. The method includes pivotally connecting the first and second clamp member bodies, and biasing the jaw portion of the first clamp member body toward the jaw portion of the second clamp member body.

In another aspect, a blanket clamp is for securing an electrically insulating blanket to a component of an electrical system. The blanket clamp includes a first clamp member defining a first jaw having a distal end portion. A second clamp member defines a second jaw having a distal end portion. The first and second clamp members are connected by a pivot connection defining a pivot axis about which the first clamp member is pivotable with respect to the second clamp member for moving the first jaw toward and away from the second jaw. The pivot connection is located proximally from the distal end portions of the jaws. A biasing element biases the jaws toward each other to a closed configuration in which the jaws engage each other. The jaws in the closed configuration define a clamp opening therebetween. The clamp opening is located between the pivot connection and the distal end portions of the jaws. The first and second jaws each include a body and a contact surface element on the body. The contact surface elements of the first and second jaws are softer than the bodies of the first and second jaws. The contact surface element of the first jaw defines an inner surface of the first jaw facing the second jaw. The contact surface element of the second jaw defines an inner surface of the second jaw facing the first jaw. The contact surface element of the first jaw at least partially bounds the clamp opening.

In yet another aspect, a blanket clamp is for securing an electrically insulating blanket to a component of an electrical system. The blanket clamp includes a first clamp member defining a first jaw having a distal end portion. The blanket clamp includes a second clamp member defining a second jaw having a distal end portion. The first and second clamp members are connected by a pivot connection defining a pivot axis about which the first clamp member is pivotable with respect to the second clamp member for moving the first jaw toward and away from the second jaw. The pivot connection is located proximally from the distal end portions of the jaws. A biasing element biases the jaws toward each other to a closed configuration in which the jaws engage each other. The jaws in the closed configuration define a clamp opening therebetween. The clamp opening is located between the pivot connection and the distal end portions of the jaws. The first and second jaws each include a body and a contact surface element on the body. The contact surface element of the first and second jaws is softer than the bodies of the first and second jaws. The contact surface element of the first jaw defines an inner surface of the first jaw facing the second jaw. The contact surface element of the second jaw defines an inner surface of the second jaw facing the first jaw. The contact surface element of the first jaw includes a segment at least partially bounding the clamp opening and extends distally along the first jaw away from the second jaw. The segment of the first jaw contact surface element can extend distally along the first jaw away from the second jaw and then extend distally along the first jaw toward the second jaw. The contact surface element of the first jaw can extend proximally along the first jaw from the distal end portion of the first jaw to the segment of the first jaw contact surface element.

In yet another aspect, a fastener is for securing an electrically insulating blanket to a component of an electrical system. The fastener includes a clamp and an insulating blanket button secured to the clamp.

In yet another aspect, a method is for securing an electrically insulating blanket to a component of an electrical system. The method includes securing the insulating blanket to a button of a fastener, and fastening the fastener on the component of the electrical system or on the insulating blanket thereby securing the blanket to the component of the electrical system.

In yet another aspect, a clamp is for securing an electrically insulating blanket to a component of an electrical system. The clamp includes a first clamp member including a lever and a jaw, and a second clamp member including a lever and a jaw. The first and second clamp members are pivotally connected to each other. A biasing element biases the first jaw toward the second jaw. An actuator is configured for permitting a shotgun stick to move the first jaw away from the second jaw against the bias of the biasing element. The actuator is secured to the lever of the first clamp member inboard from an outer surface of the lever facing away from the lever of the second clamp member. The actuator extends through an opening in the lever of the second clamp member. The actuator includes a receiver outboard of an outer surface of the second lever facing away from the first lever. The receiver is configured for receiving a hook of the shotgun stick for pulling the actuator to pull the first lever toward the second lever.

In yet another aspect, a fastener is for securing an insulating blanket to a component of an electrical system. The fastener includes a key ring opening having a relatively thin side wall to facilitate installation of a key ring in the key ring opening.

In yet another aspect, a method is for molding a clamp member. The method includes installing an insert in a mold defining a cavity for molding the clamp member. The insert is configured for molding first indicia on the clamp member. The method includes injection molding a clamp member in the cavity. The clamp member has the first indicia thereon. The method further comprises removing the insert from the mold and inserting a mold configured for molding second indicia different than the first indicia. The method includes injection molding a second clamp member in the cavity, the second clamp member having said second indicia thereon.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
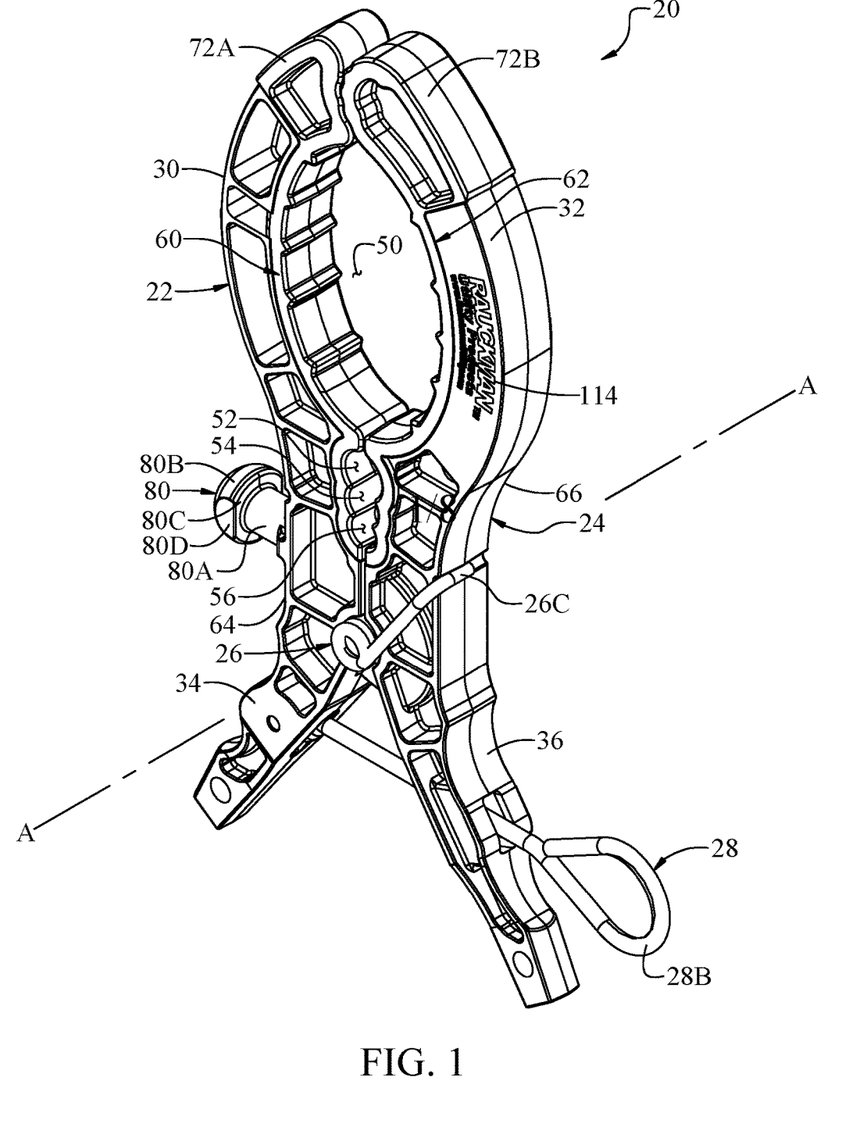
FIG. 1 is a front perspective of a clamp of the present disclosure.
Figure 2:
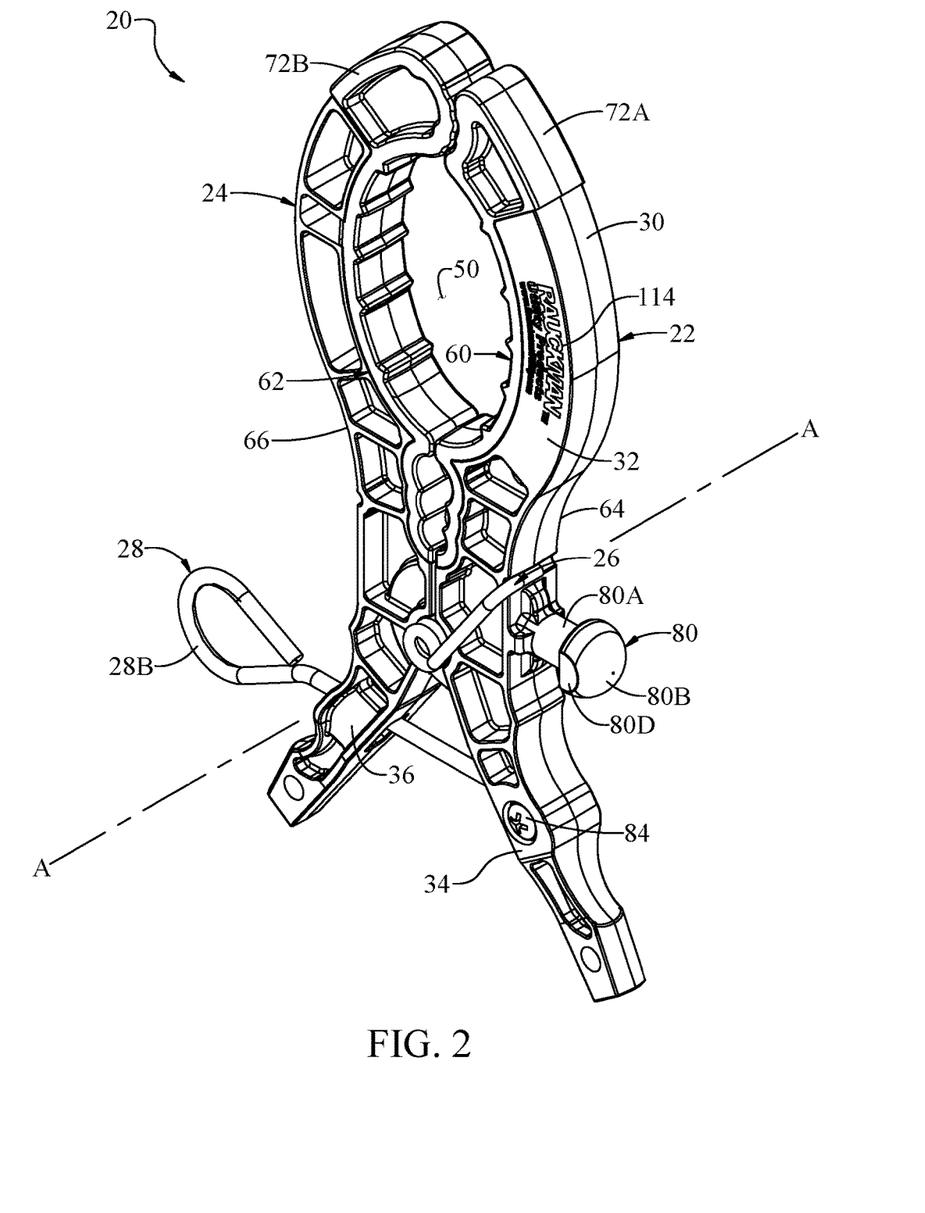
FIG. 2 is a rear perspective of a clamp of FIG. 1.

Referring to FIGS. 1 and 2, a clamp of the present disclosure is indicated generally by the reference number 20. The clamp 20 can be referred to broadly as a fastener and can be used for various tasks associated with electrical systems, such as holding an insulating blanket (e.g., electrically insulating blanket) on or near components of the electrical system for insulating people and/or equipment from the components. However, it is to be understood that the clamp 20 could be used to clamp items other than insulating blankets, and could be used in contexts other than electrical distributions systems, including situations not involving electrically charged objects. In a particular example, the clamp 20 can be used to hold an insulating blanket or other cover in position to protect workers from shock from energized components of an electrical distribution system during line maintenance. Various types of insulating blankets are known. As will be explained in further detail below, the clamp 20 is configured for improved mounting of insulating blankets.

As shown in FIGS. 1 and 2, the clamp 20 generally includes first and second clamp members 22, 24, a torsion spring 26 (broadly "biasing member"), and a hot stick actuator pin 28 (broadly, "an actuator"). The clamp members 22, 24 are pivotally connected to each other by the torsion spring 26 defining a pivot axis A (FIGS. 1, 2). The clamp members 22, 24 define a pair of jaws 30, 32 and a pair of levers 34, 36. The jaws 30, 32 are biased toward each other by the torsion spring 26. The levers 34, 36 are biased away from each other by the torsion spring 26 and are configured to enable a user to open the clamp 20 by overcoming the bias of the torsion spring.

Figure 6:
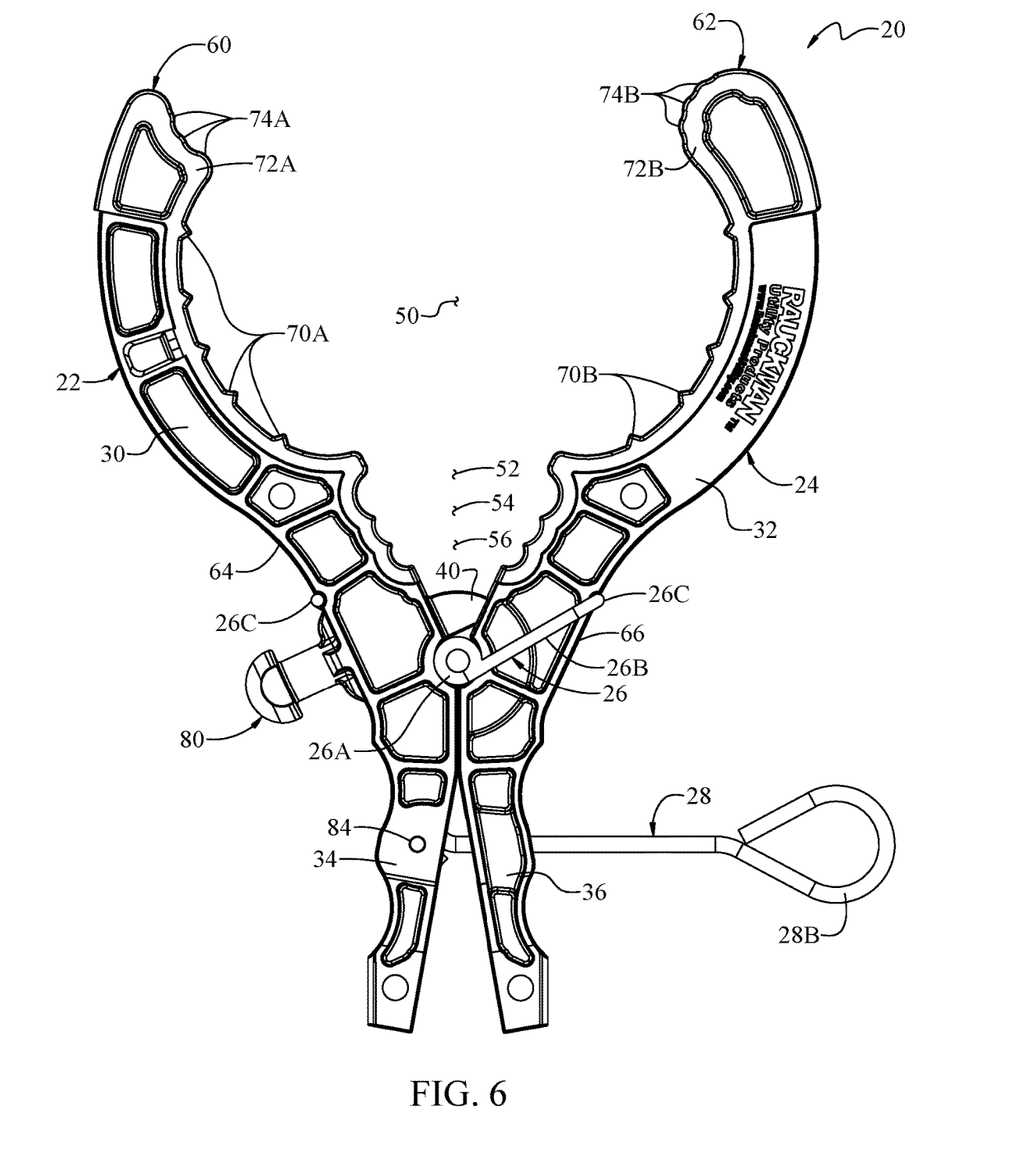
FIG. 6 is a front elevation of the clamp in an open configuration.

The clamp 20 is shown in a clamped or closed configuration in FIGS. 1, 2, 4, and 5 and in an unclamped or open configuration in FIG. 6. In the unclamped configuration, a gap is formed between distal end portions of the jaws 30, 32, i.e., a mouth between the distal end portions is opened, for receiving something between the jaws. In FIGS. 1, 2, 4, and 5, the distal end portions of the jaws 30, 32 are in contact with each other, preventing the jaws from moving closer toward each other. It will be understood if an insulating blanket and/or something else is positioned between the jaws 30, 32, the distal end portions may be spaced from one another in a clamping configuration of the clamp.

Figure 3:
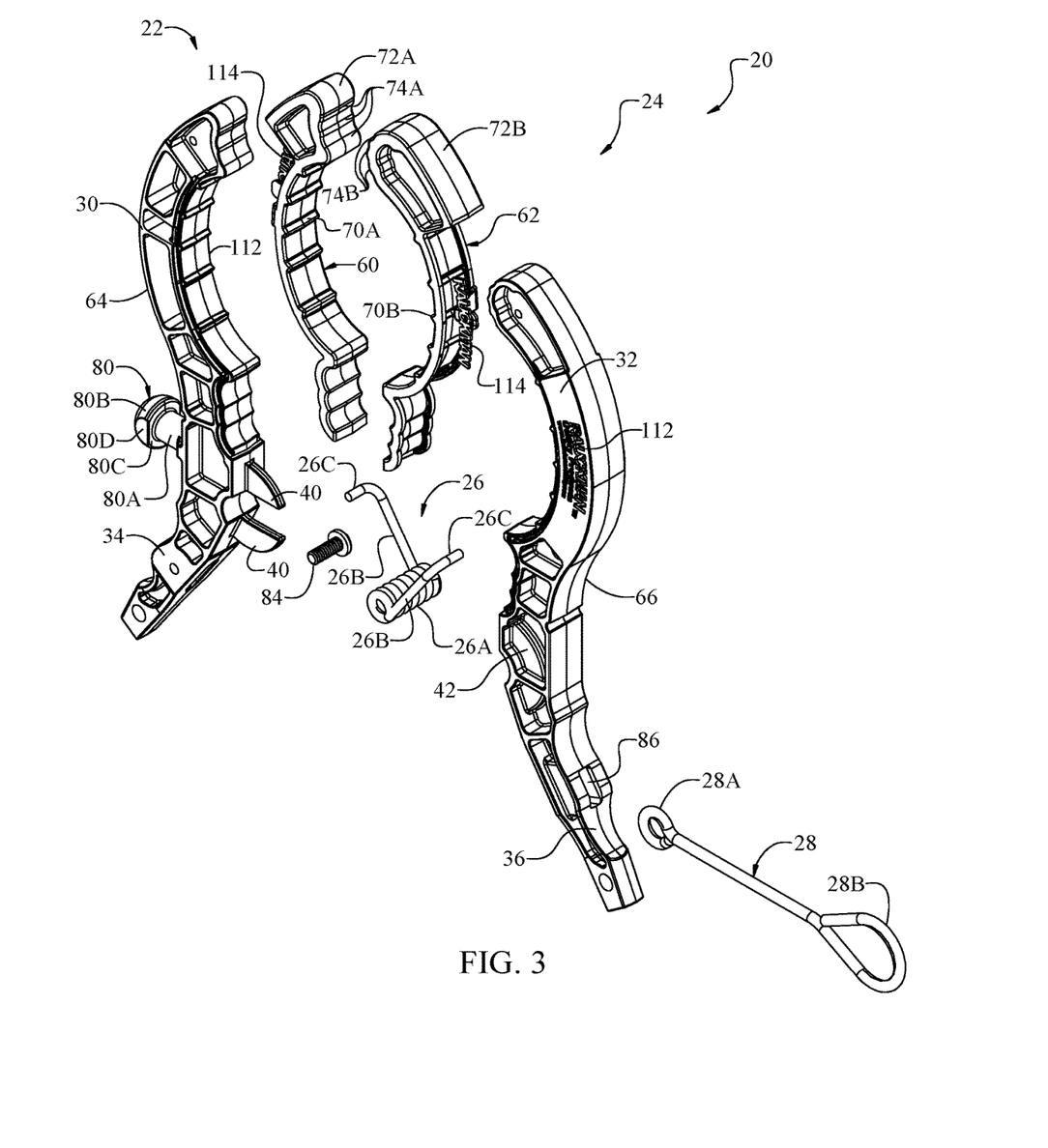
FIG. 3 is a front exploded view of the clamp.

As shown in FIG. 3, the torsion spring 26 includes a helical spring section 26A and legs 26B extending outwardly from the helical spring section at opposite ends of the helical spring section. The torsion spring 26 also includes feet 26C extending from distal ends of the legs 26B in a direction transverse to the legs. When the clamp 20 is assembled, the helical spring section 26A is positioned between the two clamp members 22, 24 and the legs 26B and feet 26C of the torsion spring 26 capture the clamp members for holding the clamp members together and biasing the jaws 30, 32 toward each other. The first clamp member 22 defines a pivot guide 40 in the form of two curved protrusions or flanges receivable respective opposite open ends of a track or slot 42 in the second clamp member 24. Reception of the guide 40 in the track 42 guides pivoting movement of the clamp members 22, 24 with respect to each other about the pivot axis A.

Each clamp member 22, 24 has an outer surface facing away from the other clamp member and an inner surface facing toward the other clamp member. Respective sections of the inner and outer surfaces form inner and outer surfaces of the jaws 30, 32 and the levers 34, 36. The inner surfaces of the jaws 30, 32 face each other and are configured for clamping on something therebetween. The inner surfaces of the jaws 32, 34 define a primary clamp opening 50 and a plurality of secondary clamp openings 52-56. The clamp openings 50-56 have generally rounded shapes. The primary clamp opening 50 is larger than the secondary clamp openings 52-56. The primary clamp opening 50 may be used for example to receive an insulating blanket and/or other object such as a post, rail, or group of wires. The secondary clamp openings 52-56 are smaller than the primary clamp opening 50 and are sized for receiving different sizes of wires or groups of wires. In the illustrated embodiment, the secondary openings 52-56 are immediately adjacent each other, but the secondary openings can be spaced from one another without departing from the scope of the present invention.

The clamp 20 is configured for providing improved clamping on items between the jaws 30, 32. For example, each jaw 30, 32 includes a contact surface element 60, 62 for engaging and gripping an object located between the jaws.

As shown in FIG. 3, each clamp member 22, 24 includes an elongate body 64, 66 forming the lever 34, 36 and a portion of the jaw 30, 32 of the clamp member. As explained in further detail below, the bodies 64, 66 can be made of rigid plastic such as by injection molding. The contact surface elements 60, 62 are provided on the jaw portions of the bodies 64, 66. The contact surface elements 60, 62 extend along substantially all of the inner surfaces of the jaws 30, 32, although other configurations can be used (e.g., segmented contact surface elements including contact surface element segments separated from each other). Segments of the contact surface elements 60, 62 bound and define the clamp openings 50-56 for engaging items clamped by the jaws at the clamp openings. The contact surface elements 60, 62 form teeth 70A, 70B (FIG. 4) extending toward the opposite jaw 30, 32 at the primary clamp opening 50. The contact surface elements 60, 62 also form boots 72A, 72B covering distal ends of the elongate bodies 64, 66 at the mouth of the clamp 20. The distal end portion of the first jaw 30 is indented for receiving the rounded distal end portion of the second jaw 32. The contact surface elements 60, 62 at the distal end portions of the first and second jaws 30, 32 define teeth 74A, 74B (FIG. 4) configured to closely conform with each other and mesh at the engagement of the distal end portions at the indentation. The meshing of the teeth 74A, 74B, and the location of the teeth at the nesting of the distal end portion of the second jaw 32 in the indentation of the distal end portion of the first jaw 30, provides a superior hold on an item clamped by the jaws at the distal end portions.

As will be appreciated, the contact surface elements 60, 62 provide significant friction against an item clamped by the jaws 30, 32. Thus, the contact surface elements 60, 62 improve the grip of the jaws 30, 32 on clamped items to prevent sliding of the jaws with respect to the clamped items. The contact surface elements 60, 62 also cushion the jaws 30, 32 on clamped items to prevent the jaws from tearing or otherwise damaging the items. For example, insulating blankets can be relatively soft and are prone to damage by clamps not suitably configured to prevent damage to them. Because the contact surface elements 60, 62 extend along the entire length of segments of the jaws that define the openings 50-56, anything clamped in the openings will be contacted by the contact surface elements instead of the more rigid material of the jaws. For example, instead of merely providing the boots 72A, 72B at the distal ends of the jaws, the contact surface elements 60, 62 extend from a proximal end of the opening 50 distally along the jaws toward and to the boots.

Various materials can be used for forming the contact surface elements 60, 62. Desirably, the contact surface element material is resiliently compressible and/or softer than material forming the bodies 64, 66. For example, a suitable material for the contact surface elements 60, 62 is a reinforced thermoplastic such as a long glass fiber reinforced nylon having a durometer in the inclusive range of 40-90 Shore A. In one embodiment the hardness of the overmolded contact surface elements 60, 62 is selected to be about the same as the hardness of the insulating blankets. The durometer of the contact surface elements 60, 62 can be about equal to or less than the durometer of the insulating blanket. The clamp 20 produces less wear on the insulating blanket when the material hardnesses of the blanket and the contact surface elements 60, 62 are nearly the same or the hardness of the contact surface elements is less. The contact surface elements 60, 62 can be overmolded onto the harder bodies 64, 66. Alternatively, the contact surface elements 60, 62 can be formed separately from the bodies 64, 66 and then applied to the bodies. Other materials, such as other polymers reinforced with other types of fibers, and materials having other properties, can be used for forming the contact surface element without departing from the scope of the present invention. Moreover, contact surface elements having other configurations, such as extending along only part of the inner surfaces of the jaws, can be used without departing from the scope of the present invention.

In another aspect of the clamp 20, a button 80 is provided for securing an insulating blanket to the clamp. In the illustrated embodiment, the button 80 is provided on the first clamp member 22 and extends outward from the outer surface of the first clamp member. More specifically, the button 80 is located adjacent the pivot connection of the clamp members 22, 24 and adjacent an intersection of the jaw 30 and lever 34 of the first clamp member 22. It will be appreciated that the button 80 can be provided in other shapes or locations, and additional buttons could be provided, such as in a similar position on the second clamp member 24 and in other locations on the first and/or second clamp members. In the illustrated embodiment, the button 80 is integrally formed with the body 64 of the first clamp member 22. The button 80 includes a neck 80A and a head 80B. A proximal end of the neck 80A is secured to the outer surface of the first clamp member 22. The head 80B is secured to a distal end of the neck 80A. The illustrated head 80B is generally bulbous, and more specifically has the general shape of a truncated sphere. The head 80B includes flats 80D (broadly "side faces") on opposite sides of the head. The generally bulbous head 80B is truncated at the flats 80D to reduce the width of the head. The flats 80D are generally parallel to each other and provide the head with reduced size to facilitate reception of the head 80B in an opening of a blanket or other object. The neck 80A is smaller in section than the head 80B, and the head forms a shoulder 80C where the head is secured to the neck. The arrangement is such that the head 80B can be inserted through an opening such as a slot or hole in an insulating blanket to secure the insulating blanket to the clamp 20. The head 80B can be larger than the hole in the blanket so that the material of the blanket is resiliently stretched as the head passes through the hole. Desirably, after the head 80B passes through the hole in the insulating blanket, blanket material contracts and the shoulder 80C functions as a retainer to retain the insulating blanket on the button 80 by blocking movement of an edge margin of the blanket bounding the opening from passing over the head 80B. For example, the neck 80A can have a length about the same as two times the thickness of the insulating blanket, such that the neck is long enough to accommodate reception of two holes of an insulating blanket or of two different insulating blankets received on the button 80. Other sizes and shapes of the button 80, such as necks having other lengths, and heads 80B having other shapes and sizes, can be used without departing from the scope of the present invention.

It will be appreciated that with the insulating blanket secured to the clamp 20 via the button 80, the clamp can be used for securing the insulating blanket in many different positions on various items. The clamp 20 can be clamped in place before securing the insulating blanket to the button 80, or the insulating blanket can be secured to the button before clamping the clamp on something. For example, with the clamp 20 secured to the blanket by the button 80, the blanket can be draped over an electrical wire or other electrical component, and the clamp 20 can be clamped on the electrical wire and/or the blanket to maintain the blanket draped on the electrical wire or other electrical component.

The clamp 20 can also be used to hang a blanket attached to the button 80 from an object. For example, several clamps 20 can be attached to supporting structure to hold a blanket secured to the clamps by way of the buttons 80.

The clamp 20 is configured to facilitate opening of the clamp by hand or by use of a hot stick such as a shotgun stick having a retractable hook. Thus, a hot stick can be used to apply the clamp 20 to or adjacent to an energized electrical component. In other scenarios, the user can hold and squeeze the levers 34, 36 in one hand to move them toward each other to open the clamp 20. In the illustrated embodiment the actuator pin 28 is a pull member for being pulled by the hot stick to open the clamp 20. The pull member 28 is formed by a wire bent to have a first relatively small loop 28A (FIG. 3) (broadly "anchor") and to have a second relatively large loop 28B (broadly "receiver") for receiving the retractable hook of the shotgun stick. The small loop 28A is received in a recess in the lever 34 of the first clamp member 22. A screw 84 (broadly "keeper") secures the small loop 28A to the first clamp member 22 so that the small loop 28A does not project from the outer surface of the clamp member. Thus the small loop 28A is secured to the first lever 34 inboard of the outer surface of the lever. The actuator pin 28 passes through an opening 86 (FIG. 3) in the lever 36 of the second clamp member 24, and the large loop 28B is positioned outboard of the outer surface of the lever 36. The actuator pin 28 can be readily attached to or removed from the clamp 20 as desired by the user for particular applications.

It will be understood that the arrangement of the actuator pin 28 and the levers 34, 36 is such that the shotgun stick can bear against the lever 36 of the clamp member 24 and the retractable hook can be engaged with the large loop 28B to pull the actuator pin to draw the lever 34 of the first clamp member 22 toward the other lever 36 to open the clamp 20. When the clamp 20 is in a desired location relative to an item to be clamped, the actuator pin 28 can be released by the hook of the shotgun stick to permit the jaws 30, 32 to clamp on the item. The shotgun stick can be used in a similar manner to open the clamp 20 to remove the clamp from the item.

It will be appreciated that the actuator pin 28 is configured to facilitate comfortable or convenient hand operation of the clamp 20. More specifically, the actuator pin 28 is configured to be relatively out of the way of a user's hand when the hand is applied to the levers 34, 36 to squeeze them. For example, the user can apply a palm of their hand to the outer surface of the first lever 34 and apply their index and middle fingers of the same hand to the outer surface of the second lever 36. Because the actuator pin 28 does not protrude from the outer surface of the first lever 34, the user's palm can be fully applied to the outer surface of the lever. On the second lever 36, the user's fingers can be positioned to straddle the actuator pin 28 such that the actuator pin passes through the fingers. Thus, the user's hand can be comfortably applied to the levers 34, 36 to apply a squeezing force to open the clamp 20.

With reference to FIGS. 1 and 6, an alternative method of installing the clamp 20 with a hot stick will be described. It will be appreciated that the free ends of the levers 34, 36 have rounded surfaces facing away from each other. When the levers are moved toward each other against the force of the biasing element 26, the free ends of the levers 34, 36 can be even closer together than shown in FIG. 6. In such a configuration, the rounded surfaces of the free ends of the levers 34, 36 together form a shape approximating a cylinder and are receivable in an open end of a hot stick. The levers 34, 36 can be moved to this configuration by hand, and then the free ends can be inserted in the open end of the hot stick, which maintains the clamp 20 in the open configuration. The hot stick can then be manipulated to position the clamp 20 for installation, and the hot stick can be actuated to push the free ends of the clamp out of the open end of the hot stick, permitting the biasing element 26 to close the clamp. The free ends of the levers 34, 36 being configured to permit secure insertion in the free end of the hot stick facilitates installation of the clamp by this method.

Figure 4:
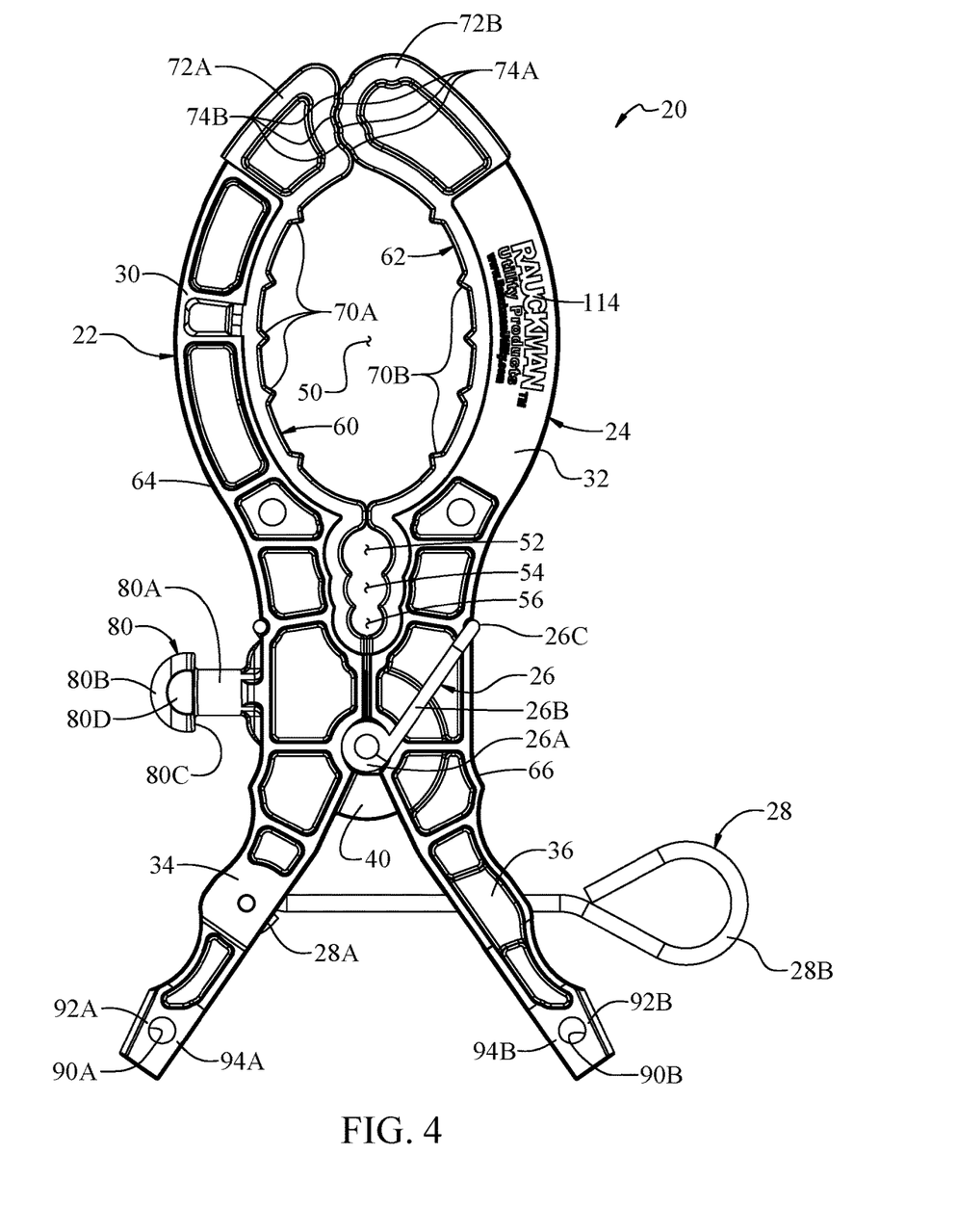
FIG. 4 is a front elevation of the clamp.
Figure 5:
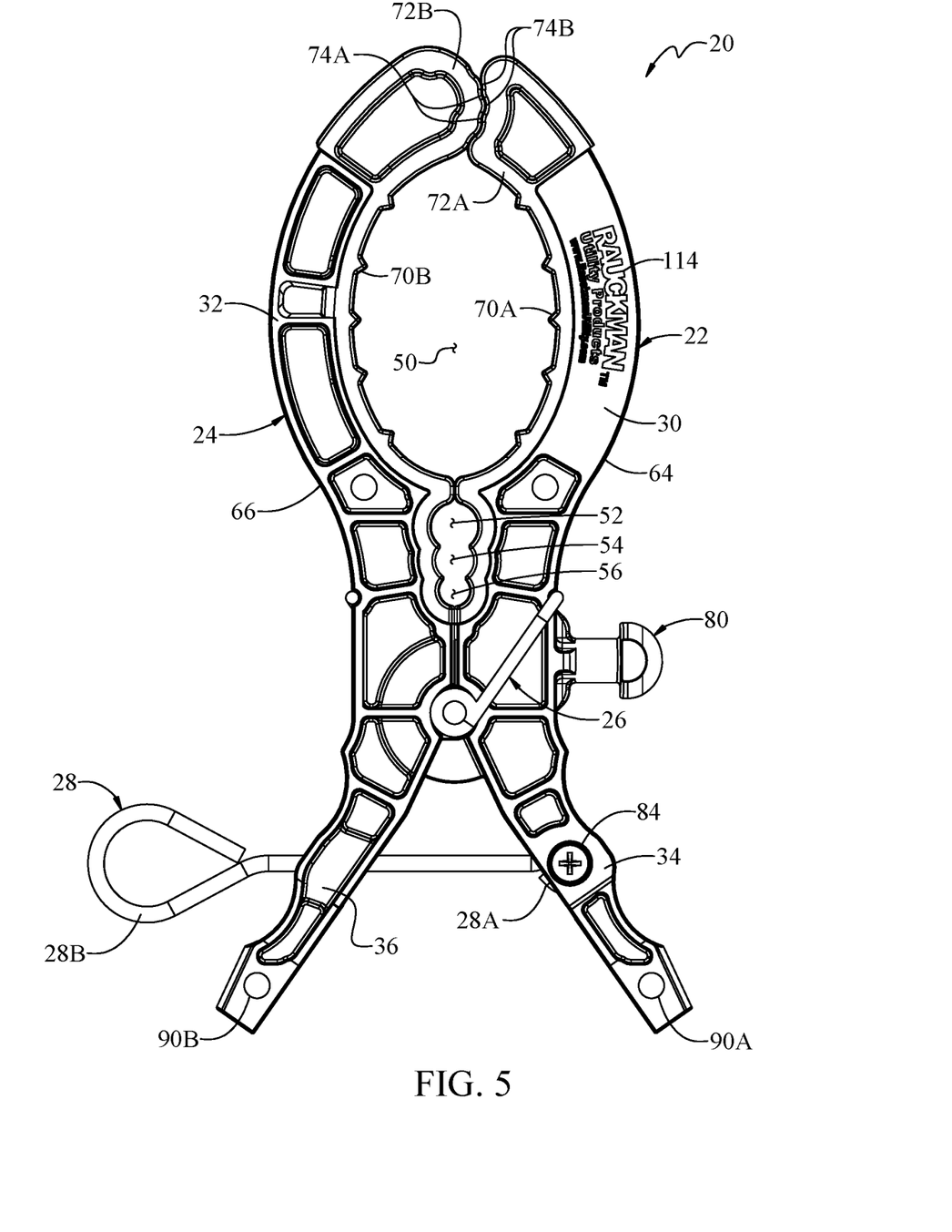
FIG. 5 is a rear elevation of the clamp.

As shown in FIG. 4, the clamp 20 includes two openings 90A, 90B configured for receiving a key ring or other connector (not shown). In the illustrated embodiment, the openings 90A, 90B are provided in the levers 34, 36 adjacent free ends of the levers. The openings 90A, 90B are configured to permit easy installation of a coiled-wire type key ring in the openings. In particular, the clamp members 22, 24 define relatively thin walls 92A, 92B between the openings 90A, 90B and the outer surfaces of the clamp members 22, 24, and define relatively thin walls 94A, 94B between the openings 90A, 90B and the inner surfaces of the clamp members. The thin walls 92A, 92B, 94A, 94B are configured such that a free end of the key ring wire requires minimal deflection away from the remainder of the key ring to readily thread the free end into the opening 90A, 90B. Installation of the key ring can then be completed by rotating the key ring until the opposite free end of the key ring wire passes through the opening 90A, 90B, at which point the key ring will be fully captured and move freely in the opening. For example without limitation, the thin wall 92A, 92B, 94A, 94B are desirably less than ⅛ inch thick between the opening 90A, 90B and the respective outer surface or inner surface of the clamp member 22, 24.

Figure 7:
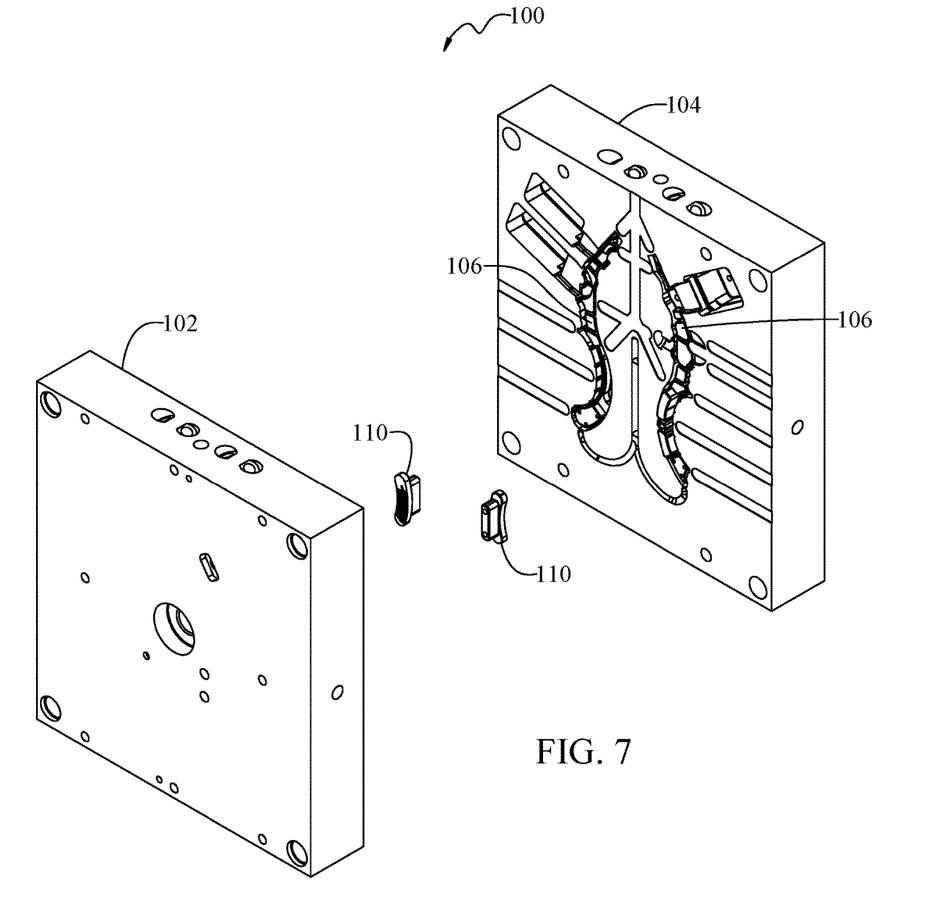
FIG. 7 is a perspective of a mold for forming components of the clamp.
Figure 8:
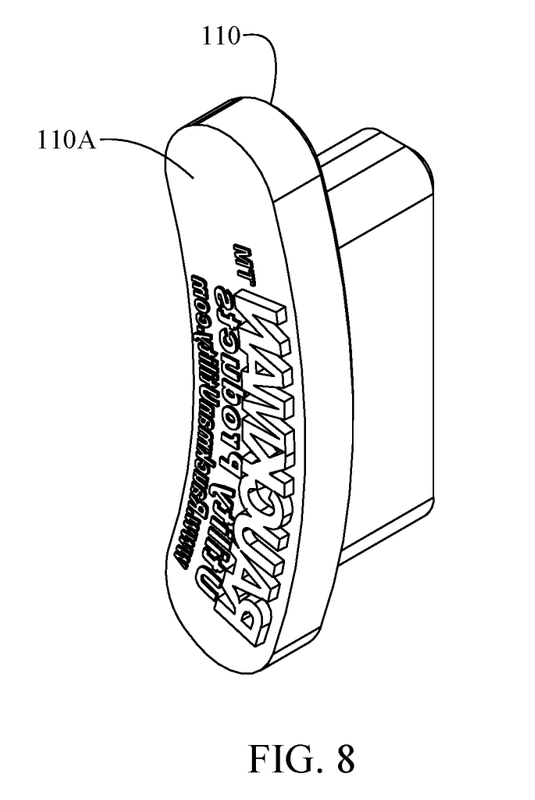
FIG. 8 is an enlarged perspective of a portion of the mold of FIG. 7.

Referring to FIGS. 7 and 8, an example mold 100 is shown for injection molding the bodies 64, 66 of the first and second clamp members 22, 24. The mold 100 includes first and second sections 102, 104 defining respective recesses 106 for cooperatively defining mold cavities when the mold sections are arranged against each other. In FIG. 7, inserts 110 are shown removed from the mold sections 102, 104. The inserts 110 are configured to mold indicia or indicators 112 (FIG. 3) on the clamp members such as a brand name, logo, or slogan. As shown in FIG. 8, each insert 110 has a mold face 110A configured to mold the indicia in the clamp member body 64, 66. In the illustrated embodiment, the indicia take the form of depressions in the shape of lettering. The inserts 110 are removable from the mold sections 102, 104 and interchangeable with other inserts such that the mold 100 can be used to form clamp member bodies of the same construction but having other indicia thereon depending on the particular insert used. For example, an insert that forms a blank surface could be used. In that case, indicia could be pad printed onto the blank surface of the clamp members instead of or in addition to molding.

In the illustrated embodiment, the molded indicia 112 on the clamp member bodies 64, 66 are depressions later filled with an overmold material 114, such as in the same overmolding step as used to form the contact surface elements 60, 62. The bodies 60, 62 of the clamp members 22, 24 are formed with passages and at least one opening through which overmold material may pass into depressions forming the indicia 112 in one or more of the bodies formed by the insert 110. In FIG. 3, the indicia overmold material 114 is shown separated from the recessed indicia 112 in the clamp member bodies 64, 66. The overmold material 114 can be of a different color (e.g., black or grey) than the material of the clamp member bodies 64, 66 (e.g., yellow) such that the filled indicia is readily apparent to a user or purchaser of the clamp.

In one version of the method, an insert similar to insert 110 can be used but which is "blank" or is configured to not mold indicia onto the clamp member. Indicia can be later added to the clamp member (e.g., in the location where indicia would be molded if an indicia molding insert 110 were used) such as by printing (e.g., pad printing) or another suitable method. Thus, molding of the clamp members using the inserts allows for versatile and different ways of providing indicia on the clamp members.

Having described the clamp in detail, it will be apparent that modifications and variations are possible without departing from the scope of the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A blanket clamp for securing an insulating blanket to a component of an electrical system, the blanket clamp comprising:
   a first clamp member defining a first jaw,
   a second clamp member defining a second jaw,
   the first and second clamp members being pivotally connected to each other for movement between a closed configuration and an open configuration,
   the first and second jaws each including a body and a contact surface element overmolded on the body, the contact surface element of the first jaw at least partially defining an inner surface of the first jaw facing the second jaw, the contact surface element of the second jaw at least partially defining an inner surface of the second jaw facing the first jaw,
   a biasing element configured to bias the jaws toward each other to the closed configuration.

2. A blanket clamp as set forth in claim 1, wherein the overmolded contact surface elements comprise a material having a hardness less than a hardness of a material forming the first and second jaws.

3. A blanket clamp as set forth in claim 2, wherein said contact surface element material comprises a fiber reinforced thermoplastic.

4. A blanket clamp as set forth in claim 3, wherein said fiber reinforced thermoplastic comprises long glass fiber reinforced nylon.

5. A blanket clamp as set forth in claim 2, wherein said contact surface element material has a durometer in the inclusive range of 40-90 Shore A.

6. A blanket clamp as set forth in claim 1, wherein the overmolded contact surface elements of the first and second jaws at least partially bound a clamp opening defined between the first and second jaws.

7. A blanket clamp as set forth in claim 1, wherein the first and second jaws define a first clamp opening in the closed configuration and the first and second jaws define a second clamp opening in the closed configuration that is separate from the first clamp opening.

8. A blanket clamp as set forth in claim 7, wherein the overmolded contact surface element of at least one of the first and second jaws at least partially bounds the second clamp opening.

9. A blanket clamp as set forth in claim 8, wherein the overmolded contact surface element of said at least one of the first and second jaws extends from the first clamp opening to the second clamp opening.

10. A blanket clamp as set forth in claim 1, wherein the jaws each include a distal end portion, and said overmolded contact surface elements define boots covering the distal end portions of the jaws.

11. A blanket clamp as set forth in claim 10, wherein the distal end portions engage each other when the jaws are in the closed configuration, and the overmolded contact surface element of at least one of the first and second jaws defines teeth where the first and second distal end portions engage each other in the closed configuration.

12. A blanket clamp as set forth in claim 11, wherein the distal end portion of the first jaw defines an indentation for receiving the distal end portion of the second jaw, the teeth of said at least one of the first and second jaws including teeth at the engagement of the first and second distal end portions at the indentation when the jaws are in the closed configuration.

13. A blanket clamp as set forth in claim 12, wherein the contact surface element of the first and second jaws define teeth at the distal end portions and the teeth mesh at the indentation when the first and second jaws are in the closed configuration.

14. A blanket clamp as set forth in claim 11, wherein the contact surface elements of the first and second jaws define teeth at the distal end portions, the teeth of the first distal end portion meshing with the teeth of the second distal end portion when the jaws are in the closed configuration.

15. A blanket clamp as set forth in claim 1, wherein at least one of the clamp members includes molded indicia.

16. A method of manufacturing a blanket clamp for securing an insulating blanket to a component of an electrical system, the method comprising:
   forming a first clamp member body having a lever and a jaw portion,
   after forming the first clamp member body, overmolding a contact surface element on at least the jaw portion of the first clamp member body;
   forming a second clamp member body having a lever and a jaw portion,
   after forming the second clamp member body, overmolding a contact surface element on at least the jaw portion of the second clamp member body,
   pivotally connecting the first and second clamp member bodies, so that the jaw portion of the first clamp member body is biased toward the jaw portion of the second clamp member body.

17. A method of manufacturing a blanket clamp as set forth in claim 16, wherein overmolding the contact surface element comprises overmolding a material comprising long fiber reinforced thermoplastic on the first and second jaw portions.

18. A blanket clamp for securing an insulating blanket to a component of an electrical system, the blanket clamp comprising:
   a first clamp member defining a first jaw having a distal end portion,
   a second clamp member defining a second jaw having a distal end portion,
   the first and second clamp members connected by a pivot connection defining a pivot axis about which the first clamp member is pivotable with respect to the second clamp member for moving the first jaw toward and away from the second jaw, the pivot connection being located proximally from the distal end portions of the jaws, a biasing element biasing the jaws toward each other to a closed configuration in which the jaws engage each other, the jaws in the closed configuration defining a clamp opening therebetween, the clamp opening being located between the pivot connection and the distal end portions of the jaws, the first and second jaws each including a body and a contact surface element on the body, the contact surface element of the first and second jaws being softer than the bodies of the first and second jaws, the contact surface element of the first jaw defining an inner surface of the first jaw facing the second jaw, the contact surface element of the second jaw defining an inner surface of the second jaw facing the first jaw, the contact surface element of the first jaw at least partially bounding the clamp opening, at least a portion of the contact surface element extending distally along the first jaw and away from the second jaw.

19. A blanket clamp as set forth in claim 18, wherein the contact surface element extends distally along the first clamp member away from the second jaw and then toward the second jaw.

20. A blanket clamp as set forth in claim 18, wherein the contact surface elements define the entire boundary of the clamp opening.

21. A blanket clamp as set forth in claim 18, wherein the portion of the contact surface element extending distally along the first jaw and away from the second jaw bounds the clamp opening.

22. A blanket clamp as set forth in claim 1, wherein the contact surface element of the first jaw includes a first portion defining a cover covering a distal free end of the body of the first jaw, and the contact surface element includes a second portion projecting from the cover proximally along the body of the first jaw toward a pivot connection pivotally connecting the first and second clamp members.

23. A blanket clamp as set forth in claim 1, wherein the body of the first jaw member defines a recess and the contact surface element on the body of the first jaw extends into the recess.

24. A blanket clamp as set forth in claim 1, wherein the body of the first jaw member defines a distal free end portion and a second portion proximal from the distal free end portion, the distal free end portion having a width reduced relative to a width of the second portion, the surface contact element being overmolded on the distal free end portion.

* * * * *